UNITED STATES PATENT OFFICE.

WILLIAM H. WOOD, OF SOUTH EUCLID, OHIO.

STORAGE BATTERY.

1,405,702.  Specification of Letters Patent.  Patented Feb. 7, 1922.

No Drawing. Application filed March 31, 1920, Serial No. 370,319. Renewed January 24, 1921. Serial No. 439,693.

*To all whom it may concern:*

Be it known that I, WILLIAM H. WOOD, a citizen of the United States, residing at South Euclid, in the county of Cuyahoga and State of Ohio, have invented a certain new and useful Improvement in Storage Batteries, of which the following is a full, clear, and exact description.

This invention relates to storage batteries and has especial reference to the composition and texture of the plates. The type of storage battery to which the invention relates is that wherein compounds of lead are employed in conjunction with sulphuric acid, the lead compounds being originally prepared in the form of finely divided oxides of lead, mixed with sulphuric acid to a proper consistency, and applied in paste form to a grid or support of metallic lead. Unless the plate be made of a porous nature, the only contact with the electrolyte and consequently the only effective action will be at the surface of the plate, as a consequence of which the capacity of the battery will be small inasmuch as the interior portions would be prevented from taking part in the operation; if the plates be made so porous as to permit the electrolyte to reach the inner portion of the paste, the plates have heretofore been friable and insufficient in physical strength, with the result that they promptly disintegrate in action; and if for the purpose of reducing the proportion of inactive material the plates be made thinner and of greater number, a similar deficiency in physical strength is the result. Attempts have been made to obtain a kind of porosity without producing weakness by mixing the plate material with finely ground sawdust and the like, but the pitchy matters are impervious and insoluble; while the cellulose portions, while pervious, have the disadvantage of being somewhat soluble in the electrolyte as a result of which a slow disintegration of the plates has sometimes resulted, especially if the level of the liquid falls sufficiently to expose a portion of the plates to the air, thus resulting in a concentration of the adherent acid.

The objects of my invention are the provision of porosity without deficiency in physical strength; the provision of a composition of matter for the plates of storage batteries which shall permit the access of the electrolyte to the inner parts thereof and increase greatly the effective surface without being soluble in such electrolyte; the admixture with the paste material of a substance which shall bind the same together and resist disintegration while being itself insoluble; while further objects and advantages of the invention will become apparent as the description proceeds.

The essence of my invention consists in mixing the paste material with finely divided fibers of animal hair from which the scales have been removed by suitable chemical means; and the animal hair which I preferably employ is sheep's wool, although I do not restrict myself to this one variety. This substance is preferably subjected to the treatment employed in the production of what is technically called "pulled wool", that is to say, is subjected for such a length of time to a suitable chemical such as milk of lime or a solution of sodium sulphide as will loosen the wool or hair from the skin on which it grows, by which action the minute scales which encrust the surface of the wool are also dissolved or removed. As a result of this action, the fibers lose their characteristic glossiness and smoothness and become soft and adherent, much like cotton; these I grind (either before or after the chemical treatment) into short lengths, say from $\frac{1}{64}$th to $\frac{1}{4}$th inch, and mix with the plate substance, preferably while the latter is dry. I employ only a very small proportion of the wool fiber, say about ten per cent by volume which constitutes only an extremely small portion by weight. The proportions are capable of very extreme variation, since the merest addition of the new substance produces a notable improvement over the present day batteries, while the upper limit is only restricted by the production of a plate which is mechanically lacking in physical strength. The wool when treated as above described adheres so closely to the paste as to bind the same against disintegration in the same manner as the hair used in plaster in the construction of houses.

This wool fiber is insoluble in sulphuric acid, at least throughout the range of concentration employed in battery work; and is at the same time sufficiently porous to permit the admission of the electrolyte to the interior portions of the plate. Practical tests have shown that a plate constructed in this manner suffers much less from overcharging than does the ordinary plate, and that when charged can be caused to yield up its electrical energy in larger proportion and considerably less time than the standard cell, as a result of which a smaller battery will perform a given task. Furthermore such a battery, owing to the thorough access of the electrical action to the interior of the plates, is much less subject to permanent sulphating than the usual battery, while buckling, crumbling, and disintegration of the active material is greatly decreased. The exterior surface of such a plate is generally rough and bristly, which further tends to increase the effective surface area and to prevent the different regions of sulphate-production from cohering into an impervious mass.

I do not restrict myself to any one kind or source of animal hair, although I prefer the wool of the sheep owing to its availability. New wool need not be employed, but with a little care in cleaning, wool can be used which is in the last stages of its employment. Neither do I restrict myself to the particular chemical treatment heretofore suggested, but any treatment can be employed which will remove the scales sufficiently to permit the desired intimacy of contact, and indeed my observation is that old wool such as felt-makers use requires less treatment owing to the mechanical removal of a considerable portion of those scales.

Having thus described my invention, what I claim is:

1. A composition of matter for the plates of storage batteries consisting essentially of oxide of lead mixed with pulled wool.

2. A composition of matter for the plates of storage batteries consisting essentially of oxide of lead mixed with animal hair from which the external scales have been removed.

3. A plate for a storage battery consisting essentially of lead oxide impregnated with short sections of animal hair from which the external scales have been removed.

4. The process of making a storage battery plate which contains the steps of subjecting animal hair to treatment which shall remove the scales, cleansing the resulting product, mixing the same with lead oxide and sulphuric acid, and spreading the same on a grid or support.

In testimony whereof, I hereunto affix my signature.

WILLIAM H. WOOD.